United States Patent [19]

Zabor

[11] 4,141,711

[45] Feb. 27, 1979

[54] AUTOMATIC PARISON FREEZE FOR A GLASSWARE FORMING MACHINE

[75] Inventor: Eric R. Zabor, Toledo, Ohio

[73] Assignee: Owens-Illinois, Inc., Toledo, Ohio

[21] Appl. No.: 868,352

[22] Filed: Jan. 10, 1978

[51] Int. Cl.² .............................................. C03B 9/40
[52] U.S. Cl. ........................................... 65/29; 65/83;
65/158; 65/160; 65/DIG. 13; 364/473;
364/476
[58] Field of Search ................... 65/29, 158, 159, 160,
65/163, 168, DIG. 13, 77, 78, 83, 230; 364/473,
476

[56] References Cited

U.S. PATENT DOCUMENTS

| Re. 29,188 | 4/1977 | Croughwell | 65/163 |
|---|---|---|---|
| 3,762,907 | 10/1973 | Quinn et al. | 65/164 |
| 3,905,793 | 9/1975 | Croughwell | 65/163 |

OTHER PUBLICATIONS

Handbook of Glass Manufacture, vol. II, by F. V. Tooley, Books for Industry Inc., 777 Third Ave., New York, N.Y. 10017, pp. 659-684.

Primary Examiner—Arthur D. Kellogg
Attorney, Agent, or Firm—D. H. Wilson; M. E. Click

[57] ABSTRACT

A method and apparatus for automatically producing a frozen parison sample in an automatic glassware forming machine which includes a blank mold station for receiving a gob of molten glass for forming a parison in a first portion of a predetermined sequence of steps and a blow mold station for receiving the parison and completing the formation of the glassware in a second portion of the predetermined sequence of steps. When an operator requests a frozen parison sample, a control means automatically alters the first portion of the predetermined sequence of steps by extending the time the parison typically remains in the blank mold such that the parison freezes. The frozen parison sample is then transferred to the previously disabled blow mold station where it can be subsequently removed for inspection.

14 Claims, 4 Drawing Figures

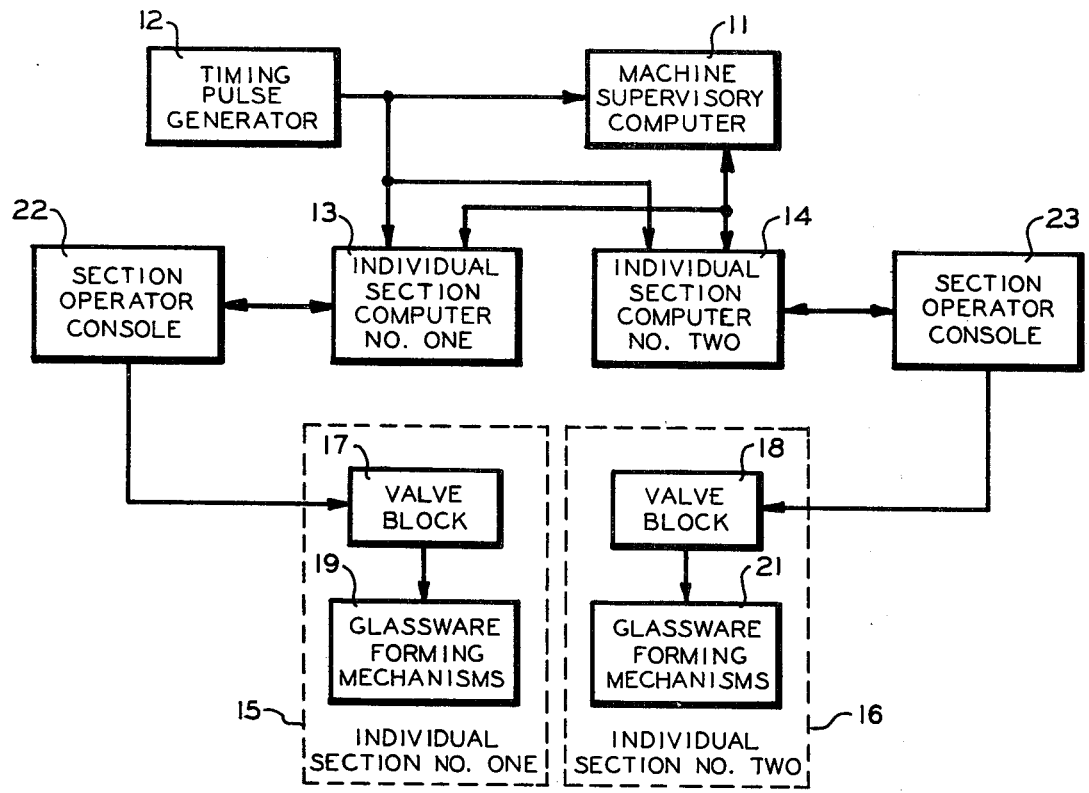
FIG. 1
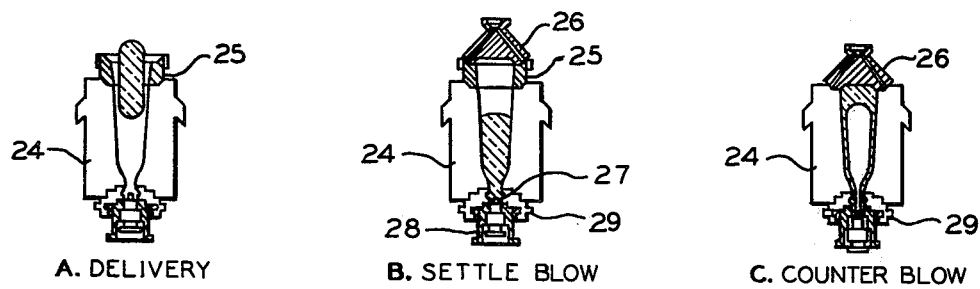
A. DELIVERY     B. SETTLE BLOW     C. COUNTER BLOW
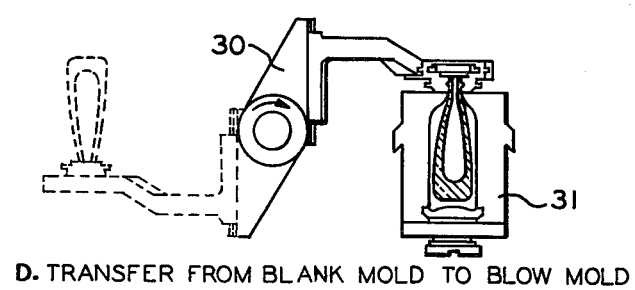
D. TRANSFER FROM BLANK MOLD TO BLOW MOLD
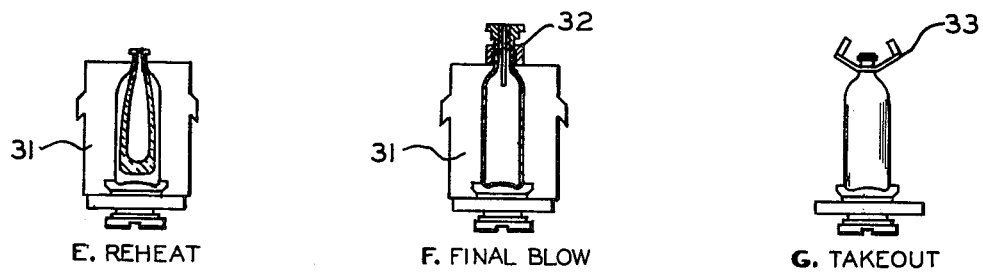
E. REHEAT     F. FINAL BLOW     G. TAKEOUT
FIG. 2

RUN CYCLE

DISTRIBUTE GOB ——————— –0°–

BLANK MOLD CLOSE ————

FUNNEL DOWN ———————— –30°–
PLUNGER UP ————
GOB ARRIVES ————
THIMBLE UP ————
BAFFLE ON ————
SETTLE BLOW ON ———————————— FINAL BLOW ON
SETTLE BLOW OFF ———— –60°–
BAFFLE OFF ————
FUNNEL UP ————
PLUNGER DOWN ————

–90°–

BAFFLE ON ————
COUNTER BLOW ON ———— –120°–

–150°–
——— FINAL BLOW OFF
COUNTER BLOW OFF ———— ——— BLOW MOLD OPEN
THIMBLE DOWN ———— ——— BLOW HEAD UP
BAFFLE OFF ———— –180°–
BLANK MOLD OPEN ————

–210°– ——— TAKEOUT IN

INVERT ———————————— ——— TAKEOUT OUT
–240°–
BLOW MOLD CLOSE ————

–270°–
NECK RING OPEN ————

REVERT ————————————
–300°–

NECK RING CLOSE ————
–330°–
BLOW HEAD ON ————

AUTOMATIC PARISON FREEZE FOR A GLASSWARE FORMING MACHINE

BACKGROUND OF THE INVENTION

1. Field of the Invention

The present invention relates generally to machines for forming glassware articles from gobs of molten glass and in particular to electronically controlled individual section glassware forming machines.

2. Description of the Prior Art

The individual section or IS glassware forming machine is well known and includes a plurality of sections each having means for forming glassware articles in a timed, predetermined sequence of steps. Typically, each section includes a blank mold station for receiving gobs of molten glass at a predetermined rate and for forming partially formed articles of glassware. A partially formed article of glassware of the type produced by the blank mold is typically referred to as a parison. The parison is then transferred to a blow mold station wherein the formation of the glassware article is completed. The sections are operated in synchronism at a relative phase difference such that one section is receiving a gob while another section is delivering a finished glassware article to a conveyor and one or more other sections are performing various ones of the intermediate forming steps.

The forming means in each section are typically operated from pneumatic motors or actuators. In early prior art machines, the pneumatic motors were controlled by a valve block which in turn was controlled by a timing drum for each section driven from a line shaft which synchronized all parts of the machine. One of the limitations of the timing drum was the difficulty of adjusting the timing during the operation of the machine. One solution to this problem was to replace all the timing drums with an electronic control means. The electronic control means included a master unit which was responsive to a clock pulse generator and a reset pulse generator driven by the line shaft. The master unit generated reset signals to an individual control circuit for each of the individual sections to synchronize the operation of the individual circuits. Each individual circuit included a pulse counter responsive to the clock pulses and the master unit generated reset pulses for counting the degrees of the section cycle. Each individual circuit included forty-eight, three-decade thumbwheel switches for setting the degree of rotation of the machine thereon. Thus, each particular function of the glassware forming cycle was controlled by one of the thumbwheel switches. Such a control system is disclosed in U.S. Pat. No. 3,762,907.

The previously described electronic control system utilized discrete components in its counter and gating circuitry. In a later prior art control apparatus, a digital computer with a memory and associated program storage was utilized. Not only did such a control circuit provide a means for automatically changing the timing values of the functions without the manual resetting of thumbwheel switches, but such a circuit also provided a means for programming events, groups of related functions, in accordance with certain boundary event timings. The computer generated control signals through an interface circuit to actuate solenoid controlled valve blocks. Such a control system is disclosed in U.S. Pat. No. 3,905,793.

One of the problems associated with the aforementioned prior art glassware forming machines occurred when one of the machine sections was producing a malformed article of glassware. It was often difficult to determine whether the malformation occurred in the blank mold station or in the blow mold station. If the parison produced by the blank station was examined before introduction to the blow mold, any defects which were observed could not be attributed to the blow station. In order to produce a parison which was sufficiently frozen to be handled and examined, the valves of the particular section had to be manually actuated to allow the parison to remain in the blank mold for an extended time such that it became sufficiently frozen. This method of producing a frozen parison sample was time consuming and consequently resulted in a drastic loss in production time.

SUMMARY OF THE INVENTION

The present invention is concerned with automatically producing a frozen parison sample in a glassware forming machine. The machine includes a gob distributor which distributes gobs of molten glass at a predetermined rate to a blank mold station which forms a parison from each molten gob of glass during a first predetermined sequence of steps. A transfer mechanism is provided to invert and transfer the parison to the blow mold station wherein the formation of the glassware is completed in a second predetermined sequence of steps.

The glassware forming machine also includes a machine supervisory computer which is connected to a plurality of individual section computers each of which is associated with a particular individual section. A separate section operator console is also provided for each section such that the status of each section can be controlled. In accordance with the present invention, an operator can request a particular section to produce a frozen parison sample utilizing a switch provided on the section operator console. Only that particular individual section which receives the request will produce a sample, while the status of all the other sections will not change.

When a frozen parison sample has been requested, the selected individual section computer initiates a sample routine wherein the last gob received by the blank mold is formed into a parison and held in the blank mold to freeze. Holding the parison in the blank mold for an extended period of time causes the parison to freeze sufficiently so that internal reheat of the parison when it is removed from the blank mold will not cause it to go soft and consequently distort its characteristics. While the parison is being frozen, the forming cycle is completed on the glass in the blow mold and this glassware is transferred from the machine. Then the blow mold functions are disabled. After the parison is frozen, the parison is inverted to the blow mold side where it subsequently can be removed for inspection.

Accordingly, it is an object of the present invention to facilitate the analysis of a malformed article of glassware produced by an automatic glassware forming machine.

It is another object of the present invention to automatically produce a frozen parison sample in an automatic glassware forming machine.

DETAILED DESCRIPTION OF THE DRAWINGS

FIG. 1 is a block diagram of a two section IS machine to which the present invention is applicable;

FIG. 2 is a schematic diagram of the sequence of forming steps in one section of an IS machine;

FIG. 3 is a timing diagram which indicate the sequence and the relative timing positions in a machine cycle at which the various glassware forming functions are performed.

DESCRIPTION OF THE PREFERRED EMBODIMENT

Figure 4:
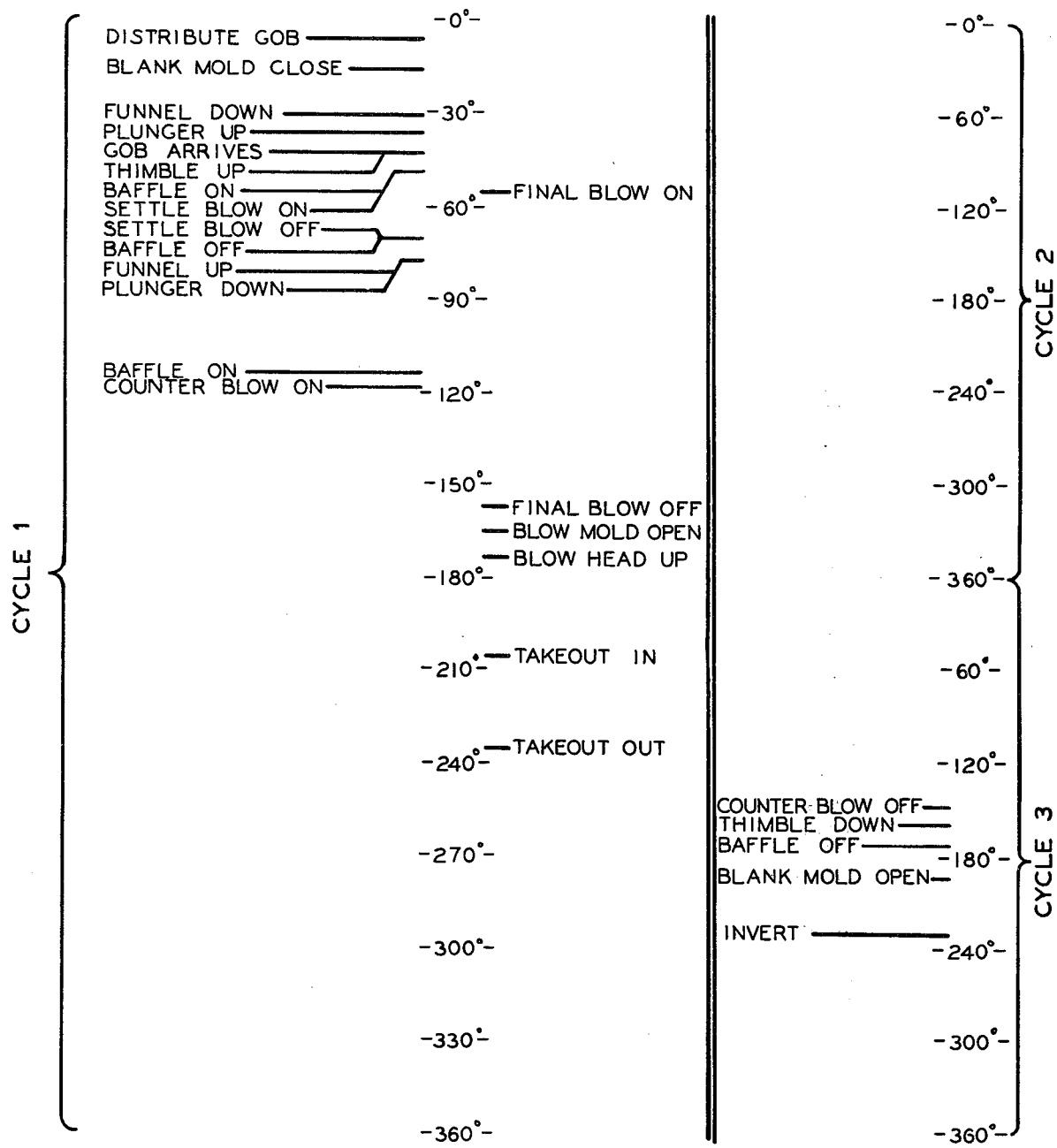
FIG. 4 is a timing diagram which indicates the sequence and relative timing positions at which the various glassware forming functions are performed to produce a frozen parison sample according to the present invention.

There is shown in FIG. 1 a block diagram of an individual section glassware forming machine to which the present invention is applicable. Although a brief description appears herein, a more detailed description of this type of glassware forming machine can be found in U.S. Pat. application Ser. No. 866,086 in the names of W. Thomas Dowling and Daniel F. Farkas and assigned to the assignee of the present invention.

A machine supervisory computer 11 receives a train of timing pulses from a timing pulse generator 12 to establish the timing for the machine cycle. The machine supervisory computer 11 is connected to a pair of individual section computers 13 and 14 which are respectively connected to an individual section No. One 15 and an individual section No. Two 16. The individual sections 15 and 16 respectively include valve blocks 17 and 18 and a plurality of glassware forming mechanisms 19 and 21.

The individual sections 15 and 16 each receive gobs of molten glass from a gob distributor (not shown). The gob distributor supplies the gobs to the individual sections at a predetermined rate proportional to the speed of the gob distributor drive motor (not shown). The speed of this drive motor is determined by the frequency of the alternating current power generated by a power source such as an inverter drive (not shown). If the timing pulse generator 12 is responsive to the frequency of the power source, the cycle time of each individual section and, therefore, the cycle time of the machine will be proportional to the gob distribution rate.

Initially, the machine supervisory computer 11 loads the individual section computers 13 and 14 with control programs and timing data for controlling the associated individual sections. Thereafter, the individual section computers 13 and 14 control the glassware forming cycles of the associated individual sections by generating control signals to the respective valve block in response to the execution of the control programs and the timing pulses from the timing pulse generator 12.

The timing pulse generator 12 generates a clock signal to the machine supervisory computer 11 and the individual section computers 13 and 14 which signal provides a reference for timing the machine cycle and the sequence of steps to be performed by the individual section computers. Typically, machine timing is expressed in degrees and a machine cycle is 360° in length. Thus, 360 clock pulses or some multiple thereof comprise one machine cycle. The cycle for each individual section is also 360° but the cycles for the sections will be offset from the start of the machine cycle by a different number of degrees to compensate for the difference in gob delivery time to each section. The timing pulse generator 12 also generates a reset pulse after generating the clock pulses representing one cycle which reset pulse is utilized by the machine supervisory computer 11 and the individual section computers 13 and 14 to define the end and beginning of successive machine cycles. This type of timing pulse generator is the subject matter of U.S. Pat. applications Ser. No. 856,387 in the names of Daniel S. Farkas and Phillip D. Perry and Ser. No. 860,934 in the names of Daniel S. Farkas and Erwin M. Ferenczy, both applications assigned to the assignee of the present invention. The timing pulses generator can also be of the shaft encoder type. In either case, the rate of distribution of the gobs is synchronized with the clock signal generated by the timing pulse generator.

The valve blocks 17 and 18 are connected to control the glassware forming mechanisms 19 and 21 respectively in a predetermined timed sequence of steps to form the articles of glassware. The valves in the valve blocks 17 and 18 are actuated by solenoids (not shown) which are controlled by the respective individual section computers in accordance with the control programs and timing data supplied by the machine supervisory computer 11.

A pair of section operator consoles 22 and 23 are connected to the individual section computers 13 and 14 respectively and to the valve blocks 17 and 18 respectively. The consoles 22 and 23 are used to make adjustments to the mechanism timing. For example, the actuation of a particular valve may be either advanced or retarded by the operator with the use of the console.

The section operator consoles 22 and 23 are also used to control the operating condition of the respective individual section. When an individual section is forming glassware, it is designated as being in the "run" condition and, when the section is not running, it is designated as being in the "safe" condition. When a section is in the safe condition, the forming mechanisms are stopped and in position for easy access such that the mechanisms can be replaced or repaired. The operator can switch to a manual mode wherein the solenoids of the valve block can be individually controlled using a plurality of switches (not shown) which are provided in the section operator console. The section operator consoles 22 and 23 each are also provided with a switch (not shown) which signals the respective individual section computer to control the respective individual section in a "sample" condition. In accordance with the present invention, when an individual section is in the sample condition, it will automatically produce a frozen parison sample which can subsequently be removed from the machine for inspection. As will be discussed, a gob of molten glass is typically formed into a finished article of glassware by first partially forming the glass in a blank station and then finishing the forming process in a blow station, both stations of which are included in a single individual section. The frozen parison sample formed by the sample condition is the partially formed article of glassware molded at the blank station prior to the introduction of the article to the blow station.

There is shown in FIG. 2 a schematic diagram of the sequence of events for one cycle of an individual section of the glassware forming machine shown in FIG. 1. These steps are illustrative of the method of forming a typical article of glassware known as the blow and blow cycle. There is shown in FIG. 3 a timing diagram of the relative positions in the section cycle at which the control signals for the various glassware forming steps are generated when the section is in the run condition. It will be understood that there is a response time associated with the actuation of the forming means associated with each of the control signals. Furthermore, the timing of these steps depends upon the type of glassware being formed and that steps may be added, deleted or repeated as necessary. Throughout the following discussion, the steps shown in FIG. 3 will be referred to in capital letters such as DISTRIBUTE GOB.

As was previously discussed, a continuous flow of molten glass is repetitively severed at a predetermined rate to produce a series of molten gobs. A gob distributor (not shown) sequentially delivers a separate gob to each individual section of the machine. As shown in FIG. 3, the distribution (DISTRIBUTE GOB) typically occurs sometime after the start of the section cycle at 0°. There is a travel time lapse between the time at which the gob is severed and the time at which the gob arrives at the blank station. As illustrated in step A of FIG. 2, the gob delivery step, during this travel time a blank mold 24 is moved into its closed position (BLANK MOLD CLOSE) and a funnel 25 is positioned on top of the mold 24 (FUNNEL DOWN) in order to guide the gob into the mold. A plunger 27, adjacent the bottom of the mold, is then moved up into position (PLUNGER UP). When the gob arrives (GOB ARRIVES), it falls through the funnel 25 and into the interior of the mold 24. At or about the same time that the gob arrives, a thimble 28 surrounding the plunger 27 is moved up into position (THIMBLE UP).

In step B of FIG. 2, the settle blow step, a baffle 26 is positioned on top of the funnel 25 (BAFFLE ON). There are the plunger 27, thimble 28 and a neck ring 29 adjacent the bottom of the mold 24. The plunger 27 extends through the thimble 28 which is enclosed by the neck ring 29. When the baffle 26 is in position, air under pressure is momentarily discharged into the top of the mold to force the molten glass into the mold and neck ring and around the plunger (SETTLE BLOW ON-SETTLE BLOW OFF) and then the baffle is removed (BAFFLE OFF). This is the settle blow step. In step C of FIG. 2, the counter blow step, the funnel is removed (FUNNEL UP) and the plunger 27 is retracted (PLUNGER DOWN) leaving a depression in the molten glass. Next, the baffle is positioned on top of the mold (BAFFLE ON) and counter blow air under pressure is introduced through the thimble and into the depression (COUNTER BLOW ON) to force the molten glass against the walls of the blank mold to produce a partially formed article of glassware referred to as a parison. The counter blow air is turned off (COUNTER BLOW OFF) and the thimble is moved down (THIMBLE DOWN). Then the baffle 26 is removed from the mold (BAFFLE OFF).

During the counter blow step, the body of the blank mold extracts sufficient heat from the parison to form a cooled skin thereon which is rigid enough to allow manipulation of the parison. In step D of FIG. 2, the invert or transfer from blank mold to blow mold step, the blank mold is opened (BLANK MOLD OPEN) and a transfer mechanism 30, attached to the neck ring 29 rotates the parison 180° (INVERT) into an open blow mold 31. The neck portion of the parison which has been positioned downward is now in the upward position. Next, the blow mold 31 is closed (BLOW MOLD CLOSE) and the neck ring is opened (NECK RING OPEN) and removed so that the parison is being supported at its neck portion by the blow mold. In this position, step E of FIG. 2, the reheat step, takes place. The skin of the parison is reheated by the relatively hot interior of the parison and the parison becomes sufficiently soft for a final blowing step. The transfer mechanism 30 and the neck ring 29 are rotated back to the blow mold (REVERT) for the next parison to be formed.

In step F of FIG. 2, the final blow step, a blow head 32 is positioned on top of the blow mold 31 (BLOW HEAD ON). Air under pressure is introduced through the blow head 32 (FINAL BLOW ON) into the interior of the parison to force the parison into the shape defined by the blow mold which is the shape of the desired article of glassware. The blow air remains on while the walls of the blow mold absorb heat from the glass such that the glassware becomes stiff enough for handling. The blow air is then turned off (FINAL BLOW OFF) and the blow mold is opened (BLOW MOLD OPEN). The blow head is then removed (BLOW HEAD UP) such that the article of glassware is ready to be removed from the section.

In step G of FIG. 2, the takeout step, a takeout mechanism 33 is moved into position to grasp the article of glassware at its neck position (TAKEOUT IN). The takeout mechanism 33 then transfers (TAKEOUT OUT) the finished article of glassware to a dead plate (not shown) for further cooling and subsequent pushout onto a conveyor (not shown).

As illustrated, in FIG. 3, the foregoing machine operation functions are performed in cycles of 360°. The forming process is a two stage process, wherein the first stage is performed at the blank station and the second stage is performed at the blow station. The respective machine functions are performed at the two stations simultaneously such that each machine cycle a blank station will produce a partially formed article of glassware and a blow station will produce a finished article of glassware. Thus, while the blow station is performing the final blow function, the bank station is producing a partially formed article of glassware to be subsequently transferred to the blow station.

When an individual section of a glassware forming machine begins to produce a malformed article of glassware, it is often difficult to determine by examination of the finished malformed glassware whether the malformation is due to the functions effected by the blank station or those effected by the blow station. If the parison produced by the blank station is examined before introduction to the blow mold, any defects which are observed cannot be attributed to any of the blow station functions. However, if no defects are found in the partially formed glassware and the finished glassware is malformed, the malformation is probably due to one or more of the blow station functions. The glassware forming machine according to the present invention can produce a frozen parison sample when one is requested by the operator.

As previously mentioned, an individual section can be switched to the sample condition wherein a frozen parison sample is produced by actuating a switch (not shown) provided on the respective section operator console. The actuation of this switch causes the respective individual section computer to initiate a sample routine wherein the last parison formed is held in the blank mold to freeze the parison. While the parison is being frozen, the forming cycle is completed on the glassware in the blow mold and this glassware is transferred from the machine. When the machine is in the run condition, the parison produced by the blank mold is typically held in the blank mold for about one-third of a machine cycle or 120°. During this time heat is extracted from the parison and the outer portion of the parison becomes sufficiently rigid to allow the parison to be transferred to the blow mold. However, once in the blow mold, the inner portions of the parison quickly reheat the outer skin and the parison becomes soft. The sample condition causes the parison to remain in the blank mold longer than it normally would such that more heat is extracted and, when the parison is removed, the internal reheat of the parison will not cause the parison to turn soft.

After the parison is frozen, the parison is inverted to the blow mold side. The blow molds are kept open and the parison is held by the neck rings. After a predetermined time, the neck rings will open to release the frozen parison and the individual section will go to the safe or not running condition. The frozen parison can now be visually inspected for thermal and mechanical defects which develop prior to constant with the blow mold.

There is shown in FIG. 4 a timing diagram which indicates the functions performed by an individual section in producing a frozen parison sample. When an operator requests a parison sample, the respective individual section computer will initiate the sample routine when the section position becomes equal to 0° and the sample routine is executed over a period of three machine cycles. Initially, the first portion of the sample routine is identical to that of the previously described run routine. The first function which is not performed by the sample routine which is performed by the run routine is the turning off of the counter blow air (COUNTER BLOW OFF). This function is disabled along with the INVERT, NECK RING OPEN, and other blank mold functions such that the parison remains in the blank mold. The gob distributor is also disabled from distributing another gob to the section.

During the first machine cycle of the sample routine, the typical blow mold functions are performed on the parison in the blow mold. After this article of glassware is transferred from the section, all the blow mold functions are disabled. Although the amount of time the parison is held in the blank mold can be varied, the parison typically remains in the closed blank mold for about two and one-quarter machine cycles. This amount of time is sufficient to freeze the parison such that, after the parison is removed from the blank mold, internal reheat will not cause the parison to turn soft.

During the second cycle of the sample routine, the blank mold remains closed to continue to freeze the parison and no machine functions are performed. However, one or more of the forming means can be actuated as a safety measure to provide a visual indication to the operator that the machine is still in an operating condition. In the third cycle, the COUNTER BLOW OFF, THIMBLE DOWN and BAFFLE OFF functions are enabled. The BLANK MOLD OPEN and the INVERT functions are also enabled for the third cycle such that the frozen parison will be transferred to the blow mold side where it is held by the neck ring. The neck ring will continue to hold the parison until the NECK RING OPEN function is performed. The respective individual section computer can be programmed to perform the NECK RING OPEN function a predetermined time period after the frozen parison has been transferred to the blow mold. When the neck ring halves are opened, the frozen parison will be released and that particular individual section will go to the safe condition. At this time the frozen parison can be removed from the blow mold station and inspected.

In summary the present invention concerns a method of obtaining a parison sample from an automatic glassware forming machine. The machine forms articles of glassware during successive cycles of a series of predetermined forming steps by distributing gobs of molten glass to a first forming means; actuating the first forming means for a first portion of the series of predetermined forming steps to form a parison from each of the gobs of molten glass; transferring each parison to a second forming means; and actuating the second forming means for a second portion of the series of predetermined forming steps to form an article of glassware from each of the parisons. The first forming means includes the blank mold and its associated apparatus for forming the parison. The second forming means includes the blow mold and its associated apparatus for forming the article of glassware from the parison.

The method comprises discontinuing the distribution of the gobs of molten glass after one of the gobs has been distributed to the first forming means; discontinuing the transfer of the parisons before the parison formed from the one gob is transferred from the first forming means to the second forming means; completing the second portion of the series of predetermined forming steps to form an article of glassware from any parison in the second forming means and automatically altering the first portion of the series of predetermined forming steps to freeze the parison in the first forming means. Typically, these steps are performed during a first cycle of the forming machine, no steps are performed during a second cycle of the forming machine and, during a third cycle of the forming machine, the frozen parison is transferred to the second forming means.

The present invention also concerns an automatic glassware forming machine having means for forming gobs of molten glass, means for forming glassware articles from the gobs of molten glass in successive cycles of a series of predetermined forming steps in response to a plurality of control signals, means for distributing the gobs of molten glass to the forming means and control means for generating the control signals. The forming means includes a first means for performing a first portion of the series of predetermined forming steps on each of the gobs to form a parison, a second means for performing a second portion of the series of predetermined forming steps on each parison to form an article of glassware, and means for transferring the parison from the first forming means to the second forming means.

The control means includes a means for generating a sample signal, such as the SOC 22 and a means responsive to the sample signal, such as the computer 13, for generating control signals to disable the gob distributing means and to disable the parison transferring means and for generating control signals to alter the first portion of the series of predetermined forming steps to freeze the parison. The control signals are generated to the first forming means to freeze a parison formed from a gob by retaining the parison such that enough heat is extracted from the parison to prevent internal reheat from turning the parison soft. The control signals are also generated to the second forming means to complete the second portion of the series of predetermined forming steps on any other parison in the forming machine.

In accordance with the provisions of the patent statutes, the principle and mode of operation of the invention have been explained in its preferred embodiment. However, it must be understood that the invention may be practiced otherwise than as specifically illustrated and described without departing from its spirit or scope.

What is claimed is:

1. A method of obtaining a parison sample from an automatic glassware forming machine which forms articles of glassware during successive cycles of a series of predetermined forming steps by distributing gobs of molten glass to a first forming means; actuating the first forming means for a first portion of the series of predetermined forming steps to form a parison from each of the gobs of molten glass; transferring each parison to a second forming means; and actuating the second forming means for a second portion of the series of predetermined forming steps to form an article of glassware from each of the parisons, the method comprising:

discontinuing the transfer of the parisons from the first forming means to the second forming means after a selected parison has been transferred to the second forming means;

discontinuing the distribution of the gobs of molten glass to the first forming means after the distribution of the next gob following the transfer of said selected parison;

completing the second portion of the series of predetermined forming steps to form an article of glassware from said selected parison; and extending the time a parison is in the first forming means and discontinuing selected steps in the first portion of the series of predetermined forming steps to freeze a parison formed from said next gob in the first forming means.

2. A method according to claim 1 including a step of transferring the frozen parison to the second forming means for subsequent removal.

3. A method according to claim 1 including a step of discontinuing the actuating of the second forming means for the second portion of the series of predetermined forming steps after said parison in the second forming means has been formed into an article of glassware.

4. A method according to claim 1 wherein during a first cycle of the automatic glassware forming machine:

the step of discontinuing the distribution of the gobs is performed after one of the gobs has been distributed to the first forming means;

the step of discontinuing the transfer of the parisons is performed before a parison formed from said one gob is transferred from the first forming means to the second forming means;

the step of completing the second portion of the series of predetermined forming steps is performed; and the step of discontinuing selected steps in the first portion of the series of predetermined forming steps is performed; wherein during a second cycle of the forming machine:

no forming steps are performed; and wherein during a third cycle of the forming machine:

a step of transferring the frozen parison to the second forming means is performed.

5. A method according to claim 4 wherein the first and second forming means include a plurality of glassware forming mechanisms and wherein during said second cycle of the forming machine at least one of said plurality of glassware forming mechanisms is actuated to provide a visual indication that the machine is in an operating condition.

6. A method of obtaining a parison sample from an automatic glassware forming machine which forms articles of glassware during successive cycles of a series of predetermined forming steps including delivering successive gobs of molten glass to a blank mold in a first forming means; performing a settle blow step to force the gob of molten glass to the bottom of the blank mold; performing a counter blow step to form a parison from the gob of molten glass; transferring the parison to a blow mold in a second forming means; performing a reheat step to soften the parison; performing a final blow step to form the article of glassware from the parison; and performing a takeout step to transfer the glassware article out of the blow mold, the steps being performed under the control of a programmed control means wherein the control means responds to a sample signal to automatically alter the series of predetermined steps to perform the method comprising:

discontinuing the delivery of gobs of molten glass after a gob has been delivered to the blank mold;

discontinuing the transfer of the parisons before a parison is formed from said gob;

completing the reheat step, the final blow step and the takeout step for any parison in the blow mold; and altering the counter blow step to hold a parison formed from said gob in the blank mold for a period of time such that sufficient heat is extracted from said parison to prevent internal reheat to soften said parison.

7. A method according to claim 6 including transferring said parison to the blow mold for removal from the machine.

8. A method according to claim 6 wherein the steps are performed during a first cycle of the forming machine.

9. A method according to claim 8 wherein no steps are performed during a second cycle of the forming machine and a step of transferring said parison to the blow mold for removal from the forming machine is performed during a third cycle of the forming machine.

10. In an automatic glassware forming machine having means for forming gobs of molten glass; means for forming glassware articles from the gobs of molten glass in successive cycles of a series of predetermined forming steps in response to a plurality of control signals; means for distributing the gobs of molten glass to the forming means; and control means for generating the control signals for controlling the forming means in the successive cycles of forming steps, the forming means including a first means for performing a first portion of the series of predetermined forming steps on each of the gobs to form a parison; a second means for performing a second portion of the series of predetermined forming steps on each parison to form an article of glassware; and means for transferring the parison from the first forming means to the second forming means, the control means comprising:

means for generating a sample signal; and means responsive to said sample signal for generating control signals to disable the gob distributing means and to disable the parison transferring means and for generating control signals to extend the time the parison remains in the first forming means and to discontinue selected steps in the first portion of the series of predetermined forming steps to freeze the parison.

11. A control means according to claim 10 wherein said means for generating control signals is a programmed digital computer.

12. A control means according to claim 10 wherein said control signal generating means disables the gob distributing means after a gob has been delivered to the first forming means and disables the transferring means before a parison formed from said gob is transferred to the second forming means.

13. A control means according to claim 12 wherein said control signal generating means generates control signals to the first forming means to freeze a parison formed from said gob by retaining said parison such that enough heat is extracted from said parison to prevent internal reheat from turning said parison soft.

14. A control means according to claim 13 wherein said control signal generating means generates control signals to the second forming means to complete the second portion of the series of predetermined forming steps on any other parison in the forming machine.

* * * * *